United States Patent Office 3,181,612
Patented May 4, 1965

3,181,612
SELECTIVE PLUGGING OF SUBTERRANEAN FORMATIONS TO INHIBIT INTRUSION OF WATER INTO OIL-PRODUCING STRATA
Samuel R. West, Evansville, Ind., and Francis E. Dollarhide, Tulsa, Okla., assignors to The Dow Chemical Company, Midland, Mich., a corporation of Delaware
No Drawing. Filed July 7, 1961, Ser. No. 122,418
12 Claims. (Cl. 166—33)

The invention is concerned with the treatment of subterranean formations penetrated by a well. It is particularly concerned with such treatment wherein the purpose is to inhibit the intrusion, influx, or encroachment of water into oil-producing strata in such formations.

Water and more usually brine often exist in the same subterranean formation as petroleum. Therefore, in the production of petroleum, water or brine is often also produced and frequently in such large amounts as to present a vexing problem. The presence of brine or water in the petroleum results in a number of problems: it directly or indirectly causes obstructing deposits in the vicinity of the wellbore or in the tubing of the well; it encourages markedly the corrosion of tubing and other well equipment employed in the production, storage and transfer of petroleum; it requires unnecessarily large quantities of liquid to be pumped from the well, stored, and handled, a large part of which has no economic value; it forms oil and brine emulsions which are extremely tight and difficult to break and which cause plugging in the formation known as water blocks thereby inhibiting the free flow of fluids to the wellbore; emulsions ultimately require the separation of the thus emulsified oil and brine or water entailing considerable expense, inconvenience, and delay; the separated brine requires the disposal thereof which in turn gives rise to the need for obtaining and caring for suitable areas or sites for such disposal, such areas usually being large acreages that become substantially destitute of vegetation as a result of the action of the brine. The production of brine and/or water along with petroleum being produced is therefore a natural condition commonly existing in oil producing formations from which alleviation is sought.

In addition to the problem of water intrusion into oil-producing strata as a result of natural causes in the formation, hydraulic fracturing of formations penetrated by a well to produce fissures and cracks therein to increase the flow of water therefrom increases the extent and severity of the water intrusion problem. Although undesirable, such increase is unavoidable, at least to some extent, because no effective means or method is known to restrict or limit the cracks and fissures, produced during the fracturing operation, to the oil-producing horizons and thereby prevent their extension to adjacent water zones. Particularly serious are the more-or-less vertical fractures frequently formed during fracturing which provide communication between oil and water strata lying superjacent or subjacent to each other.

The need for a satisfactory method of preventing or inhibiting the encroachment or intrusion of brine and/or water into oil-bearing strata by underground water, e.g., connate water, has long existed in the production of petroleum. Many attempts have been made to block off selectively the intrusion of the water or brine without appreciably stopping the flow of petroleum to the wellbore. However, such attempts have heretofore not been fully satisfactory.

The need for a more effective method of inhibiting the intrusion of the water, therefore, still continues. It is the principal object of the invention to meet this need. The way by which this need is met is made clear in the ensuing description and is particularly defined in the appended claims.

The invention, broadly, comprises admixing with an oil-base fracturing liquid, a polyurethane polymer which is substantially insoluble in water but which is swellable upon contact with water and not swellable upon contact with an oil and injecting the oil-base composition containing the polymer down a well penetrating oil- or gas-bearing strata and back into the formation where at least a portion of the polymer remains so located that intruding waters, upon entering the oil-producing strata, will come in contact with the polymer and thereby be inhibited from further intrusion into the oil- or gas-bearing strata. The invention is particularly applicable as an improved well-fracturing operation wherein the polymer is dispersed in an oil-base fracturing liquid, the liquid polymer so made injected into the well at fracturing pressures, and at least a portion of the polymer forced into and deposited in newly formed fractures.

The liquid employed may be an oil-base liquid, e.g., crude oil, gas oil, diesel oil, or kerosene, or any oil-water emulsion, gelled oil, or an oil containing a thickening or colloid-producing agent.

A particularly effective fracturing liquid for use in the practice of the invention is the polyurethane polymer dispersed in a gel prepared by admixing an oil, e.g., crude oil, an aqueous solution of sodium hydroxide, and a mixture of relatively long carbon chain fatty acids. The following recipe, for example, is illustrative of a gelled oil fracturing liquid: 1000 parts by volume of crude oil, 15 parts by volume of a 30 percent by weight aqueous solution of NaOH, and 7.5 parts by volume of a mixture of long chain fatty acid, e.g., a mixture by volume of about 85 percent tall oil and about 15 percent octanoic acid.

Another particularly effective fracturing liquid to use is a hydrocarbon oil, e.g., kerosene, containing the polyurethane polymer, to which is admixed a colloid-producing clay such as bentonite.

The polyurethane polymer employed in the practice of the invention is the reaction product of a diisocyanate and a polyoxyalkylene glycol (hereinafter sometimes referred to as a polyglycol) having a molecular weight of between about 2000 and about 50,000 preferably between about 4000 and about 20,000. The ratio of diisocyanate to the polyglycol must be between about 2 and 3. The preferred molar ratio of the diisocyanate to the polyglycol is between 2.1 or 2.2 and 2.8. A molar ratio of diisocyanate to the polyglycol of less than 2 makes the resulting polymer too water-soluble and a molar ratio of greater than 3 makes the resulting polymer too dimensionally stable to swell sufficiently when in contact with water.

The preferred polyglycols to employ are polyoxypropylene glycol or polyoxyethylene glycol. Any aliphatic or aromatic diisocyanate may be employed. Tolylene diisocyanate is more readily available commercially and is therefore used hereinafter as illustrative.

In a preferred embodiment of the invention, up to about 4 percent, and preferably between 1 and 3 percent, by weight of the polymer, of a bisphenol-alkylene oxide adduct is employed in the polymer/oil-base composition.

Procedures which may be employed for the preparation of the polyurethane polymer for use in the practice of the invention are illustrated immediately below.

*Procedure 1.*—A polyglycol, of suitable molecular weight, is dissolved in an inert organic solvent, e.g., benzene, in a reaction vessel preferably equipped with a reflux condenser.. The solution is heated to remove water. A measured quantity of tolylene diisocyanate (or other diisocyanate) to give the desired molar ratio, and a catalyst are then admixed with the solution. Although a number of known urethane polymerization catalysts may be employed, a catalyst often employed is sodium acetate. The use of this catalyst is expedient because the polyglycol often contains some residual sodium acetate which was employed as a catalyst in the making of the polyglycol. The catalyst concentration is usually between 100 and 600 parts per million parts of the reaction mixture. The reaction temperature employed is usually about 80° C. and the reaction period about 1.5 hours. Other polyglycols, other isocyanates, and other catalysts, particularly other catalysts yielding monovalent metallic ions in solution, e.g., sodium ions, may be employed. A polyurethane is thus produced which, upon separation from the reaction mixture and drying, has good strength and elongation properties. For use in the practice of the invention it is preferably ground to a particle size such that not over about 20-25 percent passes through a 100 mesh sieve and substantially all passes through a 20 mesh sieve (U.S. standard sieve series).

The polyurethane polymer thus made possesses the property of swelling when contacted with water and then resisting the passage of water therethrough.

*Procedure 2.*—A measured quantity of a hydrocarbon oil, e.g., kerosene, is poured into a suitable reaction vessel and between 1 and 5, usually between 2 and 3 percent by weight of bentonite or other thickening agent, admixed therewith. The resulting mixture is heated to between about 80° and 95° C. A weighed amount of the polyglycol, usually polyoxyethylene glycol or polyoxypropylene glycol, is then admixed therewith while maintaining the advanced temperature. Thereafter a suitable quantity of an inert organic solvent of a relatively low boiling point, e.g., hexane to serve as a reaction medium, and between about 1 and 4 percent of an adduct (based on the weight of the polyoxyalkylene glycol), separately prepared by reacting ethylene oxide and an isoalkylidene diphenol in a molar ratio of about 2:1 is admixed therewith. Bisphenol A is usually employed as the diphenol. When Bisphenol A is employed, the adduct may be represented by the following formula

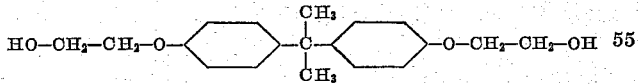

The resulting mixture is then heated, usually to between about 120° and 135° C., for between about 0.25 and 1 hour (usually about 0.5 hour) and then cooled back down to between about 80° and 95° C. Between 2.1 and 2.8 moles of a diisocyanate, usually tolylene diisocyanate, per mole of the polyglycol, are then added to the reaction mixture followed by a sufficient amount of an amine catalyst, e.g., triethylenediamine, to give a pH value of between about 9 and 10. The amounts set out below represent preferred amounts of the reactants to employ:

| Ingredient | Molar weight | Weight in grams |
|---|---|---|
| Polyoxyethylene glycol | 1.0 | 4,000–20,000 |
| Bisphenol A—ethylene oxide adduct | 0.57–0.855 | 180–270 (2–3%) |
| Tolylene diisocyanate | 2.1–2.8 | 365.4–487.2 |

The resulting mixture is heated or digested for from 1 to 2 hours while maintaining the 80° to 95° C. temperature. It is usually thereafter neutralized, e.g., by adding an aqueous mineral acid, preferably a 5–25 percent aqueous solution of HCl. The composition thus made is then cooled and transferred to tanks or drums.

The preparation made according to Procedure 2 may be used in accordance with the invention but it is usually further diluted with an oil-base treating composition.

The polymers prepared by either of the above methods is effective at the temperatures ordinarily encountered in oil-producing formations. It is most effective at temperatures of between 60° and 190° F. The pressures encountered in subterranean oil-producing zones do not prevent the polymer from swelling and accomplishing the purpose for which it is injected into the well.

In the practice of the invention, there may be employed a propping agent, e.g., sand, having a particle size of between 20 and 40 mesh in an amount of between about 0.5 and 6 pounds per gallon of fracturing liquid and more usually between about 2 and 4 pounds per gallon of fracturing fluid.

The practice of the invention also contemplates the use of known fluid-loss additives in conjunction with the water shut-off polymer. An example of the fluid loss additive employed effectively with the oil base treating fluid containing the polyurethane present in accordance with the invention is that described in U.S. Patent 2,779,735 which consists of oil-insoluble finely divided solids, an oil-soluble ionic surface active agent, and an agglutinant such as a long carbon chain fatty acid soap. The fluid-loss additive such as that of the named patent is employed in an amount of at least 0.0025 pound per gallon of oil in the fracturing liquid.

If desirable, other known additives having specific functions in well treating oil-base liquid may also be added to the composition for use in the practice of the invention. Among such additives are antioxidants of which 2,6 di-t-butyl cresol, usually in an amount of about 0.1 percent by weight of the polyoxyalkylene glycol employed in the manufacture of the polymer, is illustrative.

To illustrate polymers useful in the practice of the invention, polyurethane polymers were prepared according to Procedure 1 described above, employing various molar proportions of polyoxyethylene glycol of different molecular weights and tolylene diisocyanate. Polymers were prepared by employing ratios of (1) less than 2 moles, (2) between 2.1 and 2.8 moles, and (3) more than 3 moles of the diisocyanate per mole of the polyglycol. Polymers prepared by employing less than 2 moles of the diisocyanate are referred to hereinafter as "substantially linear"; those prepared by employing between 2.1 and 2.8 moles of the diisocyanate as "limited cross-linked" and those employing 3 or more moles of the diisocyanate per mole of the polyglycol as "highly cross-linked."

Tests to determine the swelling characteristics of the polyurethane polymer were conducted as follows:

(1) A single particle of each polymer of known density, from those weighing approximately 0.02 gram, was weighed to the nearest milligram. The volume was calculated from the weight and density.

(2) A weighed particle was immersed in each of the aqueous liquids set out in Table I below.

(3) After immersion for 4 hours in the liquid, each particle (which was water-insoluble) was removed, lightly blotted to remove excess liquid, and the volume of the particle again ascertained.

(4) The volume ratio of dry polymer to polymer after immersion in the aqueous liquids was calculated as follows:

$$\frac{\text{swollen volume}}{\text{dry volume}} = \text{volume ratio}$$

Table I below shows the effect on the polymer, of diisocyanate and polyoxyethylene glycol of varying molecular weight, reacted in varying molar ratios, when immersed in aqueous liquids.

II. The elongated tube simulated a subterranean fracture which was filled with the sand-polymer mixture following a fracturing operation. Each of water, a 25 percent by weight brine (1.36% MgCl$_2$, 4.25% CaCl$_2$, and

*Table I*

| Run No. | Polymer | Molecular weight of polyoxyethylene glycol employed | Behavior in aqueous media and factor by which volume [a] of polymer swelled | | |
|---|---|---|---|---|---|
| | | | In water | In brine [b] | In 15% by weight aqueous HCl |
| 1 | Linear polymer [c] | 4,000 | Dissolved | Dissolved | Dissolved. |
| 2 | do | 9,000 | do | do | Do. |
| 3 | do | 20,000 | do | do | Do. |
| 4 | Limited crosslinked [d] polymer | 4,000 | Swelled by a factor of 20 | Swelled by a factor of 17 | Swelled by a factor of 26. |
| 5 | do | 9,000 | do | Swelled by a factor of 12 | Swelled by a factor of 45. |
| 6 | do | 20,000 | Swelled by a factor of 30 | Swelled by a factor of 25 | Swelled by a factor of 43. |
| 7 | Highly crosslinked [c] polymer | 4,000 | No appreciable swelling | No appreciable swelling | No appreciable swelling. |
| 8 | do | 9,000 | do | do | Do. |
| 9 | do | 20,000 | do | do | Do. |

[a] Swelled volume divided by dry volume.
[b] Composed by weight of 1.36 percent MgCl$_2$, 4.25 percent CaCl$_2$, 19.39 percent NaCl and 75 percent water.
[c] For comparison.
[d] Suitable for use in practice of invention.

Reference to Table I shows that the substantially linear polymers dissolved in the aqueous media and that the highly cross-linked polymers remained generally unaffected by immersion in the aqueous media. In contrast thereto, the limited cross-linked polymers, when contacted with water, brine, or hydrochloric acid, swelled in a most impressive manner. The thus swollen cross-linked polymers are substantially impervious to the passage of water therethrough and, therefore, are clearly satisfactory for plugging off interconnecting pores, channels, and narrow passageways through which water seeps or flows into which they are placed.

To show the effect of the polymer on the passage of liquids through a constricted passageway containing the polymer, a polymer was prepared, according to method 1 above, by reacting tolylene diisocyanate and a polyoxyethylene glycol, having a molecular weight of 20,000, in a ratio of 2.5 moles of the diisocyanate per mole of the glycol. The polymer was tested for the passage therethrough of: water, the brine described at the foot of Table I, and kerosene. The kerosene was used because it has properties similar to a low viscosity crude oil and its use simulates that of crude oil in a formation and offers obvious advantages for test purposes.

The tests were run to ascertain the plugging effect of the polymer by positioning a vertically elongated tube 1 foot long and 1 inch in diameter and provided with an inlet line into the top and outlet line from the bottom, each line being equipped with a pressure gauge. The tube was successively filled with mixtures of varying ratios of each of the polyurethane polymers prepared above and sand in the weight proportions shown in Table 19.39% NaCl, balance water), and kerosene was then forced vertically downwardly through the various sand-polymer mixtures in the vertical tube. Both (1) the difference in pressure of the liquid before and after passing through the simulated fracture filled with the sand-polymer mixture and (2) the flow of liquid after contacting the polymer in the various sand-polymer mixtures were determined. A large drop between the pressure of the liquid before and after contacting the polymer in the sand-polymer mixture and a marked decrease in flow of liquid from the sand-polymer mixture shortly after the polymer contacted the mixture show the plugging effect, if any, caused by the liquid contacting the polymer. This test is considered particularly severe since it is thought that most fractures in subterranean formation are considerably less than 1 inch across, e.g., 0.1 inch or less, and usually serpentine. Accordingly fractures in a formation are more easily plugged. Table II below shows the results of the test runs.

*Table II*

| Run No. | Sand polymer mixture in weight percent | | Test fluid in percent by weight forced into column of mixed sand and polymer | | | Pressure gradient [a] in p.s.i.[b]/foot of sand polymer column | Fluid forced through sand-polymer column in bbl.[c]/da./ft.$^2$ |
|---|---|---|---|---|---|---|---|
| | Sand | Polymer | Water | Brine [d] | Kerosene | | |
| 10 | 100 | 0 | 100 | 0 | 0 | 500 | 20,000. |
| 11 | 99 | 1 | 100 | 0 | 0 | 1,125 | 890. |
| 12 | 98 | 2 | 100 | 0 | 0 | 1,125 | 700. |
| 13 | 97.5 | 2.5 | 100 | 0 | 0 | 2,500 | 0.050. |
| 14 | 97 | 3 | 100 | 0 | 0 | 2,500 | 0.020. |
| 15 | 96 | 4 | 100 | 0 | 0 | 2,500 | 0.005. |
| 16 | 95 | 5 | 100 | 0 | 0 | 2,500 | 0.002. |
| 17 | 95 | 5 | 0 | 100 | 0 | 2,500 | 0.150. |
| 18 | 95 | 5 | 5 | 0 | 95 | 50 | Steady stream. |
| 19 | 95 | 5 | 10 | 0 | 90 | 2,500 | None. |

[a] Pressure gradient is differential in reading of the gauges in inlet line and outlet line.
[b] Pounds per square inch.
[c] Barrels per day per square foot.
[d] Brine is that described in footnote (b) of Table I.

Reference to Table II shows that water, in the absence of the polyurethane polymer prepared as required for use in the invention (Run No. 10), passes readily through the sand contained in the simulated fracture. On the other hand, as little as 1 percent of the polymer intermixed with 99 percent propping sand (Run No. 11), when wetted with water, very definitely decreases the permeability of the polymer-sand mixture shown by the reduced flow of water therethrough and the increased pressure differential. It further shows that when the percent of the polymer is increased successively to 2, 2.5, 3, and 4 percent, by weight of the polymer-sand mixture (Runs 12 to 15), that both the permeability and the flow of water through the polymer-sand mixture are markedly decreased. A particularly marked decrease clearly occurs when the percent of polymer is increased from 2 to 2.5 percent. The table also shows that an increase from 4 to 5 percent (Run No. 16) does not appear to decrease the permeability. Further examination of Table II shows that, although 5 percent polymer in the polymer-sand mixture, when employing a 25 percent brine as the contacting liquid, is effective (Run No. 17), the reduction in outflow of brine is somewhat greater than with water alone. The table also shows that a relatively small amount of water intermixed with kerosene, as evidenced by 5% water-95% kerosene (Run No. 18) has no apparent plugging effect upon the sand in a fracture. In rather dramatic contract to the lack of measurable effect produced by only 5% water in the kerosene, 10% water in kerosene (Run No. 19) completely stopped all liquid flow from the simulated fracture containing the sand-polymer mixture. The data conveyed by Runs No. 18 and 19 are significant since they show that small amounts of water contained in oil will not plug the fractures when filled with a sand-polymer mixture, but as the percent of water therein becomes appreciable, plugging ensues.

A well treating composition was prepared following Procedure 2, as described herein above, employing the ingredients in the amounts set forth below:

Ingredient: Amount
- Kerosene _____ 100 parts by weight.
- Bentonite _____ 3.0 parts by weight.
- Polyoxethylene glycol mol. wt. of 9,000 __ 100 parts by weight.
- Triethylene diamine __ 0.735 part by weight.
- Tolylene diisocyanate . to produce 2.45 moles per mole of the polyglycol.
- Ethylene oxide—Bisphenol A adduct (molar ratio of 2:1) _____ 2 parts by weight.

Hexane was added with the polyglycol and subsequently volatilized off. The reaction mixture was neutralized to a pH of 6–7 by the addition of 10% by weight aqueous HCl. A polyurethane polymer in kerosene was thus made. Although the polymer thus dispersed in kerosene may be used as such (or diluted or extended with additional oil), for purposes of testing its efficacy as a swelling agent when contacted by water, it was separated from the kerosene and dried. Its swelling effect was then ascertained according to the following procedure: 1 milliliter (weighing 1.2 grams) of the polymer was admixed with 100 milliliters of water in a test tube and allowed to stand therein for 2 hours with periodic shaking. After 2 hours, a slight vacuum was applied to the top of the tube to bring the polymer to the top of the water. The volume of the polymer, originally occupying 1 milliliter, was then ascertained. The volumes of five 1-milliliter samples, after contact with water for 2 hours are shown in Table III below.

Table III

| Run No. | Original volume in milliliter | Volume after 2 hours in water in milliliters |
|---|---|---|
| 20 | 1 | 30 |
| 21 | 1 | 38 |
| 22 | 1 | 34 |
| 23 | 1 | 42 |
| 24 | 1 | 40 |

Reference to Table III shows the marked increase in volume of a polymer, suitable for use in the practice of the invention, after contact with water for 2 hours.

The preferred embodiment of the invention, employing a polymer prepared by one of the above procedures and which, accordingly, has the swelling and plugging properites when contacted by water, as demonstrated above, is carried out, broadly, by fracturing a formation employing well known techniques, e.g., that set out in general languages in Farris Reissue Patent 23,733, except that the fracturing liquid used in the invention contains between about 10 and about 400 pounds and more usually between 40 and 200 pounds of polymer per 1000 gallons of fracturing liquid. The preferred practice of the invention employs between about 500 and 5000 pounds of flint shot sand, of between 20 and 40 mesh size, per 1000 gallons of fracturing liquid. The amount of polymer employed is usually between about 10 and about 50 pounds thereof per 1000 pounds of sand. The polymer is preferably particulated to a size consisting of a mixture of sizes −20 and +100.

To show the effect of variations in particle size, tests were run employing a polymer prepared according to Procedure 1 above, made by reacting tolylene diisocyanate and polyoxyethylene glycol having a molecular weight of about 20,000 in a molar ratio varying from 2.2 to 2.5 moles of tolylene diisocyanate per mole of the polyglycol. The polymer so made was reduced to particle sizes ranging from 8 to 325 mesh and graded into the particle-size ranges shown in Table IV. Each of the graded portions of the polymer were admixed with propping sand of 20 to 40 mesh in the weight proportions shown in Table IV. Thereafter the sand-polymer mixtures were placed in a 1-inch cylinder, precisely as in the runs shown in Table II above, but wherein water only was employed.

Table IV

| Run No. | Sand-polymer mixture in weight percent | | Polymer mesh size | Pressure gradient in p.s.i./ft. | Fluid flow in bbl./da./ft.² |
|---|---|---|---|---|---|
| | Sand | Polymer | | | |
| 25 | 96.5 | 3.5 | 8 to 20 | 500 | 1,165 |
| 26 | 96.5 | 3.5 | 20 to 40 | 1,250 to 1,200 | 709 |
| 27 | 96.5 | 3.5 | 20 to 325 | 2,500 | 1 |
| 28 | 96.5 | 3.5 | 40 to 60 | 2,500 | 0.1 |
| 29 | 96.5 | 3.5 | 40 to 100 | 2,500 | 0.1 |
| 30 | 96.5 | 3.5 | 60 to 80 | 2,500 | 0.1 |
| 31 | 96.5 | 3.5 | 80 to 100 | 2,500 | 0.1 |
| 32 | 96.5 | 3.5 | 100 to 170 | 2,500 | 0.1 |
| 33 | 96.5 | 3.5 | 170 to 325 | 2,500 | 0.1 |

An examination of Table IV shows that the particle size of the polymer is significant. A particle size of not greater than 20 mesh (i.e., one wherein substantially all the polymer passes through a 20 mesh sieve), intermixed with a substantial percentage of smaller particles, is required to obtain good results. It appears from the table that a particulated polymer consisting of a mixture of between 40 and 100 mesh is desirable and that the presence of particles smaller than 100 mesh is not adverse to the desired blocking or plugging effect of the polymer when wet with water. Although other size of sand particles than 20–40 mesh may be used, this range represents the size most usually employed in well fracturing.

The following example illustrates the treatment of a well in accordance with the invention.

The well treated was located in Greenwood County, Kansas. It had a total depth of 2404 feet. It traversed an oil-bearing zone at between 2334 and 2347 feet and penetrated a water-bearing zone at 2349 feet. The casing was perforated at 1-foot intervals through the oil-bearing zone. The well was cemented off at a depth of 2371 feet.

The well had been acidized by treating it with 500 gallons of 15 percent by weight aqueous HCl solution containing 3 percent by weight ammonium bifluoride the day prior to being treated according to this example. Production during the day following the acidizing was 9 barrels of oil and about 18 barrels of water.

A volume ratio of water to oil of from between 10 and 100 to 1, following fracturing, was characteristic of the production of wells in this formation. It was, therefore, highly desirable that the well be fractured without the concomitant high increase in water flow.

The treatment of the well according to the invention was as follows:

2943.75 gallons of lease crude oil were placed in a 5000-gallon mixing tank. 33.75 gallons of a 30 percent by weight aqueous solution of NaOH followed by 22.5 gallons of a mixture of 85 percent tall oil and 15 percent octanoic acid by volume were admixed with the crude oil. A gelled oil was thereby produced. The mixing tank containing the gelled oil was then connected to a pumping assembly for injection down the well.

659.8 pounds of a 20–30 mesh size propping sand, 150 pounds of the fluid loss additive described in U.S. Patent 2,779,735, and 202 pounds of the polyurethane polymer of tolylene diisocyanate and polyoxyethylene glycol (molecular weight of 20,000) prepared according to Procedure 1 above, were placed in a Rotovoy mixer and positioned for feeding down the well bore. The polymer was of a size such that substantially all passed through a 20 mesh sieve and only 20.9 percent passed through a 100 mesh sieve.

The gelled oil was then pumped down the wellbore while the mixture of polyurethane polymer and sand was blended into the gelled oil stream as it entered the well head. When fracture had occurred, as evidenced by pressure changes shown on surface gauges, injection was stopped and the well was maintained under a pressure of 500 pounds per square inch gauge reading. After 1 hour, the pressure had dropped to below atmospheric pressure indicating that the treating fluid had flowed out into the formation but that no appreciable amount of water from the formation was exerting pressure on the well. This phenomonon is indicative of plugging off of water intruding zones leading to the wellbore. Such dropping off of pressure on a well following fracturing was not heretofore observed in wells in this formation.

Two days following treatment according to the invention, the well was put back in production. It produced 240 barrels of oil per day and no water. The treatment in accordance with the invention is clearly successful.

The advantages to be realized from the practice of the invention are significant. Fracturing may be carried out which greatly increases oil production without an increase in water production. Frequently there is a decrease in water production. Oil passes through the polymer deposited in the fractures without impediment but water is blocked off effectively by contacting the polymer so deposited.

Having described our invention, what is claimed and desired to be protected by Letters Patent is:

1. The method of fracturing a well penetrating a subterranean formation into which water and brine intrude consisting essentially of admixing a particulated substantially dry water-swellable polyurethane polymer prepared by reacting a diisocyanate and a polyoxyalkylene glycol in a molar ratio of between 2 and 3 of the diisocyanate per mole of the glycol with an oil-base liquid, to form a suspension of the polymer in the oil-base liquid, said polymer being used in a ratio of between about 10 and about 400 pounds thereof per 1000 gallons of the oil-base liquid, having a swelled volume when brought in contact with a liquid selected from the class consisting of water and brine, obtained by dividing the swelled volume by the dry volume, of at least about 10 and injecting the resulting mixture down the well and back into the formation, where intruding water comes in contact therewith, at an injection pressure sufficient to create fractures in the formation.

2. The method according to claim 1 wherein propping sand is admixed with the oil-base liquid in an amount sufficient to provide between 1000 and 5000 pounds thereof per 1000 gallons of the oil-base liquid.

3. The method according to claim 2 wherein the amount of polymer and sand employed is between about 10 and about 50 pounds of polymer per 1000 pounds of sand.

4. The method according to claim 2 wherein the polyoxyalkylene glycol is selected from the class consisting of polyoxyethylene glycol and polyoxypropylene glycol having a molecular weight of between about 2000 and about 50,000.

5. The method according to claim 4 wherein the molar ratio of diisocyanate to the polyoxyalkylene glycol is between 2.2 and 2.8.

6. The method according to claim 4 wherein the molecular weight of the polymer is between 4000 and 20,000.

7. The method of treating a mineral-bearing formation having a wellbore penetrating the formation consisting essentially of (a) preparing a polymer composition comprising admixing between 1 and 5 parts by weight of a colloid-producing clay with 100 parts with an oil-base liquid selected from the class consisting of crude oil, kerosene, gas oil, diesel oil, gelled oil, and oil-water emulsions; heating the resulting mixture to between about 80° and about 95° C.; admixing a polyoxyalkylene glycol therewith selected from the class consisting of polyoxyethylene glycol and polyoxypropylene glycol having a molecular weight of between about 2000 and about 50,000; heating the resulting mixture to between about 120° and 130° C. for between about 0.25 and 1 hour; cooling the mixture to between about 80° and 95° C.; admixing therewith between 2.2 and 2.8 moles of a diisocyanate per mole of the polyoxyalkylene glycol; admixing therewith an amine in an amount sufficient to give a pH value of between about 9 and 10; continuing to heat the resulting mixture at between 80° and 95° C. and volatilizing off the inert solvent to form a particulated substantially dry water-swellable polyurethane polymer having a swelled volume when brought in contact with a liquid selected from the class consisting of water and brine, obtained by dividing the swelled volume by the dry volume, of at least about 10 suspended in kerosene, (b) injecting the thus suspended polymer down the wellbore and back into the formation, (c) after a lapse of time of at least 0.5 hour, pumping the well to remove any pumpable ungelled polymer therefrom.

8. The method according to claim 7 wherein the amount of kerosene employed is between 0.5 and 1.5 times the weight of polymer employed.

9. The method according to claim 7 wherein the kerosene-suspended polymer composition is diluted with additional oil-base liquid to give a polymer concentration of between 10 and 400 pounds per 1000 gallons of the thus diluted polymer composition.

10. The method according to claim 7 wherein the polymer suspended in the kerosene is recovered therefrom and dried and thereafter admixed with an oil-base liquid to give a polymer concentration of between 10 and 400 pounds per 1000 gallons of the resulting composition.

11. The method according to claim 7 wherein a substantially inert, low-viscosity, low boiling organic solvent is admixed with the clay and oil-base mixture together with the polyoxyalkylene glycol prior to heating at from 120° C. to 130° C. and adding the diisocyanate thereto.

12. The method according to claim 7 wherein an adduct of ethylene oxide and an isoalkylidenediphenol, prepared by reacting a molar ratio of at least 2 moles of ethylene oxide per mole of the diphenol, is admixed with the admixture of oil-base liquid, clay, and polyoxyalkylene glycol (prior to admixing the diisocyanate) in an amount of between 1 and 4 percent by weight of the polyalkylene glycol.

References Cited by the Examiner

UNITED STATES PATENTS

| | | | |
|---|---|---|---|
| 2,827,121 | 3/58 | Nowak | 166—33 |
| 2,867,278 | 1/59 | Mallory et al. | 166—33 |
| 2,889,883 | 6/59 | Santora | 166—33 |
| 2,896,717 | 7/59 | Howard | 166—33 |

CHARLES E. O'CONNELL, *Primary Examiner.*